(12) United States Patent
Lovlie

(10) Patent No.: US 10,293,744 B1
(45) Date of Patent: May 21, 2019

(54) AUTOMATIC TURN-SIGNAL SYSTEM

(71) Applicant: Jan H. Lovlie, Edina, MN (US)

(72) Inventor: Jan H. Lovlie, Edina, MN (US)

( * ) Notice: Subject to any disclaimer, the term of this patent is extended or adjusted under 35 U.S.C. 154(b) by 0 days.

(21) Appl. No.: 15/630,170

(22) Filed: Jun. 22, 2017

Related U.S. Application Data

(60) Provisional application No. 62/353,642, filed on Jun. 23, 2016.

(51) Int. Cl.
*B60Q 1/40* (2006.01)
*B62D 1/04* (2006.01)
*B60Q 1/34* (2006.01)

(52) U.S. Cl.
CPC ............... *B60Q 1/40* (2013.01); *B60Q 1/343* (2013.01); *B62D 1/046* (2013.01)

(58) Field of Classification Search
CPC .......... B60Q 1/0082; B60Q 1/46; B60Q 1/40; B60Q 1/343; B62D 1/046
See application file for complete search history.

(56) References Cited

U.S. PATENT DOCUMENTS

| | | | |
|---|---|---|---|
| 2,793,262 A | 5/1957 | Albert | |
| 4,302,748 A * | 11/1981 | Gant | B60Q 1/46 340/471 |
| 5,469,338 A | 11/1995 | Sims | |
| 5,739,751 A * | 4/1998 | Ishihara | B60Q 1/1469 200/61.27 |
| 5,790,017 A * | 8/1998 | Berryhill | B60Q 1/38 340/474 |
| 5,823,666 A * | 10/1998 | Kingsolver | B60Q 1/1484 200/61.54 |
| 5,955,944 A | 9/1999 | Donner | |
| 6,034,600 A * | 3/2000 | Browne | B60Q 1/382 116/28 R |
| 6,144,297 A * | 11/2000 | Donner | B60Q 1/1484 200/61.27 |
| 8,446,265 B2 * | 5/2013 | Golomb | B60Q 1/0082 340/425.5 |
| 9,272,724 B2 * | 3/2016 | Golomb | B60Q 1/0082 |
| 2005/0021190 A1 * | 1/2005 | Worrell | B60K 35/00 701/1 |
| 2006/0044129 A1 * | 3/2006 | Patel | B60Q 1/0082 340/475 |
| 2012/0283894 A1 * | 11/2012 | Naboulsi | B60R 11/0264 701/1 |

FOREIGN PATENT DOCUMENTS

| | | |
|---|---|---|
| CA | 606063 A | 10/1960 |
| JP | 2004284516 A | 10/2004 |

* cited by examiner

*Primary Examiner* — Orlando Bousono
*Assistant Examiner* — Son Tang
(74) *Attorney, Agent, or Firm* — Moss & Barnett; Michael A. Bondi

(57) ABSTRACT

An automatic turn-signal system including a steering wheel, a first turn-signal switch and a second turn-signal switch. The steering wheel is associated with a vehicle. The first turn-signal switch is mounted to the steering wheel. The second turn-signal switch is mounted to the steering wheel.

7 Claims, 1 Drawing Sheet

Steering Wheel

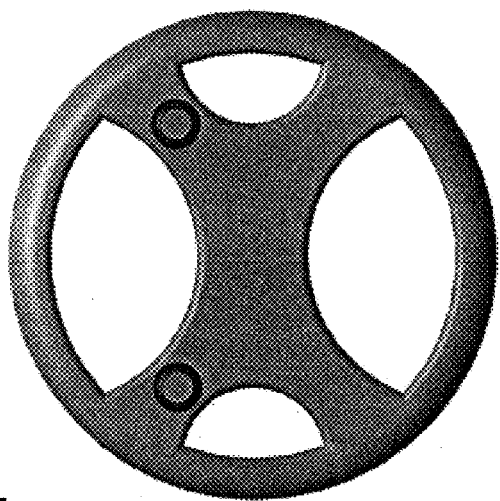
Fig. 1 Steering Wheel
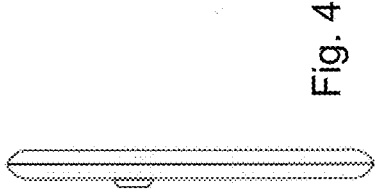
Fig. 4 Side View
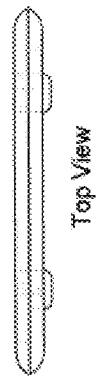
Fig. 3 Top View
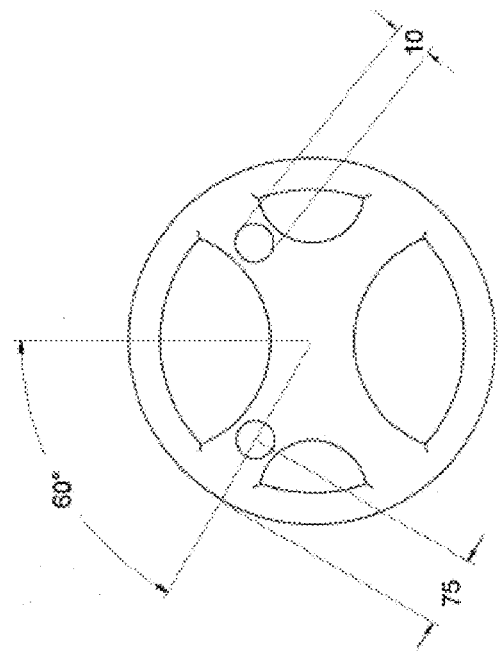
Fig. 2 Front View

AUTOMATIC TURN-SIGNAL SYSTEM

REFERENCE TO RELATED APPLICATION

This application claims priority to Provisional Applic. No. 62/353,642, filed on Jun. 23, 2016, the contents of which are incorporated herein by reference.

FIELD OF THE INVENTION

The invention relates to a vehicle turn directional indicator. More particularly, the invention relates to an automatic turn-signal system for a vehicle.

BACKGROUND OF THE INVENTION

The old-fashioned turn-signal system, which has been the standard for about 100 years, is inconvenient to use, and therefore not used regularly by all drivers.

The traditional turn-signal control keeps you continually involved at a time when your attention should be 100% on your driving. Click your turn-signal on, and you have to remember to turn it off. Your standard turn-signal will sometimes turn itself off after completion of your turn, but not always. In the case of a lane-change, for example, your return to going straight may not be abrupt enough, and your turn-signal will continue to blink until you manually turn it off, perhaps several kilometers down the road.

The other option you have with the traditional turn-signal system is to keep the perfect pressure on the turn-signal lever until you are done signaling your turn or lane-change, and then release the lever. This action interferes with the ability of a driver to control the steering wheel. It also occupies the driver both physically and mentally at a time when the driver's total attention to driving is absolutely crucial.

Why do we use the turn-signal? The purpose of using your turn-signal is to eliminate surprises by informing others around you in advance what you plan to do. By making your turn-signal easier to operate, the turn-signal will be used regularly by most drivers, perhaps all. Traffic safety will improve, accidents will be reduced and so will injuries and fatalities.

SUMMARY OF THE INVENTION

An embodiment of the invention is directed to an automatic turn-signal system that includes a steering wheel, a first turn-signal switch and a second turn-signal switch. The steering wheel is associated with a vehicle. The first turn-signal switch is mounted to the steering wheel. The second turn-signal switch is mounted to the steering wheel.

Another embodiment of the invention is directed to a method of using an automatic turn-signal system that is associated with a vehicle having a steering wheel. The automatic turn-signal system is provided that includes a first turn-signal switch and a second turn-signal switch. The first turn-signal switch and the second turn-signal switch are mounted to the steering wheel. The first turn-signal switch is activated to cause a first turn-signal light to flash a first number of times. The second turn-signal switch is activated to cause a second turn-signal to flash the first number of times.

Another embodiment of the invention is directed to a method of activating lights in a vehicle. A turn-signal system is provided in the vehicle. An emergency flashing light system is provided in the vehicle. The emergency flashing light system is activated. The turn-signal system is activated. Activating the turn-signal system causes the emergency flashing light system to deactivate.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a front view of a steering wheel that incorporates an automatic turn-signal system according to an embodiment of the invention.

FIG. 2 is another front view of the steering wheel.

FIG. 3 is a top view of the steering wheel.

FIG. 4 is a side view of the steering wheel.

DETAILED DESCRIPTION OF THE INVENTION

The automatic turn-signal system eliminates the problems with the old-fashioned turn-signal system, and is less expensive to manufacture. Using this invention, the automatic turn-signal system is activated with two button switches 12, 14 located on the steering wheel 10.

A person driving the vehicle in which the automatic turn-signal system is installed can reach these switches 12, 14 easily such as using at least one thumb without losing grip and control of the steering wheel 10. Even a driver who has lost the use of one hand, temporarily or permanently, can now activate the automatic turn-signal system in either direction. The automatic turn-signal system turns off automatically—every time.

The automatic turn-signal system described here, and shown in the attached drawings, is a simple system for activating your turn-signal with two button switches 12, 14 on the steering wheel 10. The button switches 12, 14 may be built into the steering wheel 10, or attached to the steering wheel 10 when developed for after-market installation.

The automatic turn-signal system 10 is used in conjunction with a steering wheel 10 on a vehicle (not shown). The steering wheel 10 is mounted in the vehicle for rotation about an axis. The steering wheel 10 may be associated with a variety of vehicles, examples of which include automobiles and trucks.

The steering wheel 10 may have an outer ring 20 from which at least one spoke 22 extends. The automatic turn-signal system 10 includes two switches 12, 14 that are associated with at least one of the outer ring 20 and the at least one spoke 22. In certain embodiments, the switches 12, 14 are mounted in the spoke 22 in a spaced-apart configuration.

The activation of the automatic turn-signal system is controlled by a computer chip, and the connection from the switches 12, 14 to the computer chip may be wired or wireless. The chip controls the switch 12, 14 that turns the associated turn-signal light on and off.

The old-fashioned lever and its connection to the steering wheel column are no longer needed, nor do we need the annoying continuous non-stop clicking. The clicking is there to remind you to turn your turn-signal off. Since the turn-signal now turns itself off automatically, the clicking is un-necessary. Instead of the clicking, a pleasant short tone may be used to notify the driver when the turn-signal starts, and an alternate pleasant short tone may be used to notify the driver when the turn-signal stops.

In certain embodiments, the automatic turn-signal system is operable in two modes that include a short sequence and a long sequence. The short sequence blinks for a shorter number of times than the long sequence. For example, the short sequence is pre-set to 5 blinks (or time equivalent). The length of the short sequence can be adjusted to the personal preference of the driver such as 3, 5 or 7 blinks. For example, the long sequence is pre-set to 15 blinks (or time equivalent). The length of this sequence can be adjusted to the personal preference of the driver such as 10, 15 or 20 blinks.

The two switches 12, 14 are located on the steering wheel 10 for easy control by a person's fingers while minimizing the need for the person to remove his/her hands from the steering wheel 10 to activate either of the switches 12, 14. The position of the switches 12, 14 on the steering wheel 10 may facilitate activating the switches 12, 14 using the person's thumbs. The spacing between the switches 12, 14 is sufficiently large to minimize the potential of the driver inadvertently activating the incorrect switch 12, 14.

In certain embodiments, one of the switches 12 is located proximate a right side of the steering wheel 10 and one of the switches 14 is located proximate a left side of the steering wheel 10.

The right switch 12 may be located at an angle of about 60° clockwise from the top center point of the steering wheel 10 when the steering wheel 10 is in its neutral position (front wheels pointing straight forward). Using a conventional clock configuration, the position of the right switch 12 corresponds to about 2 o'clock. The center of the right switch 12 may be about 75 millimeters from an outer edge of the steering wheel 10 in a radial direction from the center of the steering wheel 10.

The left switch 14 may be located at an angle 30 of about 60° counterclockwise from the top center point of the steering wheel 10 when the steering wheel 10 is in its neutral position (front wheels pointing straight forward). Using a conventional clock configuration, the position of the left switch 14 corresponds to about 10 o'clock. An angle between the switches 12, 14 is thereby about 120 degrees about a rotational axis of the steering wheel 10. The center of the left switch 14 about 75 millimeters from an outer edge of the steering wheel 10 in a radial direction from the center of the steering wheel 10.

The switches 12, 14 may be formed with a shape that facilitates the person operating the vehicle readily identifying the location of the switches 12, 14 and operating the switches 12, 14 without needing to look at the steering wheel. In certain embodiments, the switches 12, 14 may be formed with a generally circular shape. In other embodiments, the switch 12 may be formed with a different shape than the switch 14 to enhance the ability for the driver to correctly identify the switch without the driver needing to look at the steering wheel 10.

The switches 12, 14 may be formed with a size that is sufficiently large to facilitate the person operating the vehicle to accurately position his/her fingers with respect to the switches 12, 14. In certain embodiments, the switches 12, 14 have a diameter 34 that is about 10 millimeters.

The shape of the switches 12, 14 may enhance the ability of the person using the steering wheel 10 to accurately identify the location of the switches 12, 14 and/or to accurately position his/her fingers with respect to the switches 12, 14 when desiring to operate the switches 12, 14. In certain embodiments, the switches 12, 14 have a convex upper surface and/or may be elevated from the surface of the steering wheel 10.

To further enhance the ability for the person operating the vehicle to accurately locate the switches 12, 14, at least one of the switches 12, 14 may be illuminated. In certain embodiments, the illumination of the switches 12, 14 may be continuous. Alternately, the illumination of the switches 12, 14 may be associated with other lighting in the vehicle such as the system that controls when headlights on the vehicle are illuminated.

In still other embodiments, the illumination of the switches 12, 14 may be different when the automatic turn-signal system is activated as opposed to when the automatic turn-signal system is not activated. For example, the switches 12, 14 may be continuously illuminated when not activated and may flash when activated.

In certain embodiments, the color in which the right switch 12 is illuminated may be different than the color in which the left switch 14 is illuminated. Such color differences may be particularly beneficial to identify the right switch 12 and the left switch 14 when the steering wheel 10 is not in the neutral position.

For example, the right switch 12 could be illuminated with the color yellow and the left switch 14 could be illuminated with the color blue. The light could be very soft and constant when turn-signal is not in operation, but slightly stronger when blinking. The intensity of the light should not be so strong as to be a distraction. In other embodiments, the lights could be in the shape of an arrow that is oriented in the direction that corresponds to the direction of the associated turn-signal.

The illuminated switches 12, 14 could eliminate the need for the indicator lights which traditionally are on the dashboard in the vehicle. Therefore, in certain embodiments, the dashboard in the vehicle that contains the automatic turn-signal system is devoid of turn-signal indicator lights.

Before making a right turn or changing to the next lane on your right, the right switch 12 is pressed 1 time. This action activates the right turn-signal in the short sequence (pre-set to 5 blinks). To activate the long sequence (pre-set to 15 blinks), press the right switch 12 a second time within a short period of time after pressing the right switch 12 the first time such as in less than about 5 seconds. In certain embodiments, both sequences turn off automatically.

Before making a left turn or changing to the next lane on your left, the left switch 14 is pressed in the same manner as described above for the right switch 12.

After 2 seconds have passed after having pressed the right or left switch 12, 14 the first time, if so desired, the turn-signal can be turned off by pressing the same switch 1 time. Also, after 2 seconds, pressing the opposite switch 1 time will turn off the active turn-signal and activate the opposite turn-signal. This will be useful when a right turn is quickly followed by a left turn, or vice versa.

The short sequence turn-signal can be used before turning into a lane designated to make a right (or left) turn. It is un-necessary, and obviously redundant, to continue to use the turn-signal while in this lane, possibly waiting for the light to change to green. Despite being unnecessary, the driver may want to use the short sequence turn-signal again immediately before making the final turn. Remember, the purpose of the turn-signal is to notify others in proximity thereto in advance what the driver plans to do.

The switches 12, 14 may be activatable in a variety of manners using the concepts of the invention. For example, the switches 12, 14 may be physically pressed and move in response to being pressed. In other embodiments, the switches 12, 14 may be activated by contact.

It is possible for the person driving the vehicle to adjust the length of both the short sequence and the long sequence. No adjustment is needed if the driver is content with the pre-set lengths. Few drivers are likely to ever change the pre-set sequences, and few drivers, other than truck drivers, will ever use the long sequence. The option to change either the short sequence or the long sequence can be made available with the computer program described here.

To adjust the short sequence, turn the ignition to the on position but engine off (not running). Press the left switch 1 time. Next, within 30 seconds, start pressing the right switch the number of times that corresponds to the number of blinks that you want. Pressing the right switch 1 time will set the short sequence to 3 blinks (or time equivalent), which is minimum. Pressing the right switch 2 times will set the short sequence to 5 blinks (or time equivalent). Pressing the right switch 3 or more times will set the short sequence to 7 blinks (or time equivalent), which is maximum.

Within 30 seconds after having pressed the right switch the desired number of times, press the left switch 1 time. This sets the new sequence length. If the left switch is not pressed again within 30 seconds, the sequence will remain at its previous setting. A person of skill in the art will appreciate that alternate techniques may be used to reconfigure the short sequence.

To adjust the long sequence, turn the ignition to the on position but engine off (not running). Press the left switch 2 times. Next, within 30 seconds, start pressing the right switch the number of times that corresponds to the sequence length that you want. Pressing the right switch 1 time will set the long sequence to 10 blinks (or time equivalent). Pressing the right switch 2 times will set the long sequence to 15 blinks (or time equivalent). Pressing the right switch 3 or more times will set the long sequence to 20 blinks (or time equivalent), which is maximum.

Within 30 seconds after having pressed the right switch the desired number of times, press the left switch 1 time. This sets the new sequence length. If the left switch is not pressed again within 30 seconds, the sequence will remain at its previous setting. A person of skill in the art will appreciate that alternate techniques may be used to reconfigure the long sequence.

When conventional vehicle emergency flashing lights are in use, the turn-signal does not work. With this invention, vehicle emergency flashing lights operate totally independently of the turn-signal. The vehicle emergency flashing lights are activated manually with a separate switch on the dashboard. In certain embodiments, the emergency flashing lights have separate light bulbs from the turn-signal light bulbs.

If the vehicle emergency flashing lights share light bulbs with the turn-signal, the activation of the turn-signal should temporarily deactivate the vehicle emergency flashing lights. When the turn-signal is turned off (or goes off automatically, as it will when the vehicle has the automatic turn-signal system), the vehicle emergency flashing lights automatically turn back on, and stay on until the vehicle emergency flashing lights are manually turned off.

The solution to the problem with the emergency flashing lights described above, is a part of this patent application. In the future it may be submitted as a separate patent application.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of using an automatic turn-signal system that is associated with a vehicle having a steering wheel, wherein the method comprises:

providing an automatic turn-signal system comprising a first turn-signal switch and a second turn-signal switch, wherein the first turn-signal switch and the second turn-signal switch are mounted to the steering wheel;

pressing the first turn-signal switch one time to cause a first turn-signal light to flash a first number of times in a first operation mode; or pressing the second turn-signal switch one time to cause a second turn-signal to flash the first number of times in the first operation mode;

pressing the first turn-signal switch two times in less than 5 seconds to cause the first turn-signal light to flash a second number of times in a second operation mode; or pressing the second turn-signal switch two times in less than 5 seconds to cause the second turn-signal light to flash the second number of times in the second operation mode, wherein the first number of times is different than the second number of times; and pressing the first turn-signal switch or the second turn-signal switch one time while the first turn-signal switch or the second turn-signal switch is activated in the first operation mode or in the second operation mode and causes the automatic turn-signal system to immediately deactivate.

2. The method of claim 1, wherein the automatic turn-signal system deactivates after the first turn-signal light flashes the first number of times or the second turn-signal light flashes the first number of times.

3. The method of claim 1, wherein at least one of the first turn-signal switch and the second turn-signal switch is illuminated.

4. The method of claim 1, wherein the first turn-signal switch illuminates in a first color, wherein the second turn-signal switch illuminates in a second color and wherein the first color is different than the second color.

5. The method of claim 1, wherein the first number of times is configurable by a user.

6. The method of claim 1, and further comprising driving a vehicle in which the automatic turn-signal system is located by a person, wherein the person has two hands that are on the steering wheel while the person is driving the vehicle, wherein the first turn-signal switch and the second turn-signal switch are operated without the person removing either of the hands from the steering wheel.

7. The method of claim 6, wherein the two hands each have a thumb and wherein the person activates the first turn-signal switch or the second turn-signal switch using one of the thumbs.

\* \* \* \* \*